United States Patent [19]

Tuber

[11] Patent Number: 5,312,029
[45] Date of Patent: May 17, 1994

[54] ARTICLE CASE AND SECURING CLIP

[75] Inventor: Howard J. Tuber, Cuyahoga Falls, Ohio

[73] Assignee: Richard D. Tschudy, New Philadelphia, Ohio ; a part interest

[21] Appl. No.: 972,803

[22] Filed: Nov. 6, 1992

[51] Int. Cl.$^5$ .................................................. A45F 5/00
[52] U.S. Cl. .................................. 224/252; 224/241; 224/269; 224/901; 248/74.2; 248/316.7; 24/3 F; 24/3 L
[58] Field of Search ............. 224/252, 235, 236, 240, 224/241, 247, 248, 253, 268, 269, 151, 901; 24/3 R, 3 L, 3 F; 248/205.2, 68.1, 74.2, 231.8, 316.7

[56] References Cited

U.S. PATENT DOCUMENTS

| | | | |
|---|---|---|---|
| 394,376 | 12/1888 | Kelton | 224/253 |
| 1,622,632 | 3/1927 | Fahnestock | 248/74.2 |
| 1,896,302 | 2/1933 | Giles | 24/3 L |
| 3,491,971 | 1/1970 | Fisher | 24/339 |
| 4,770,328 | 9/1988 | Dickhudt et al. | 224/252 |
| 5,056,661 | 10/1991 | Balzano | 224/247 |

FOREIGN PATENT DOCUMENTS 1237437  3/1967  Fed. Rep. of Germany ...... 224/252

*Primary Examiner*—Linda J. Sholl
*Attorney, Agent, or Firm*—Low and Low

[57] ABSTRACT

A unique article case and clip cooperatively associated therewith wherein the clip is preferably integrally formed with the case or comparable base member, and includes confronting major and minor tongues whereby the clip may be associated as desired with varying supports. The clip may also be employed apart from a case or carrier in a wide variety of environments.

16 Claims, 5 Drawing Sheets

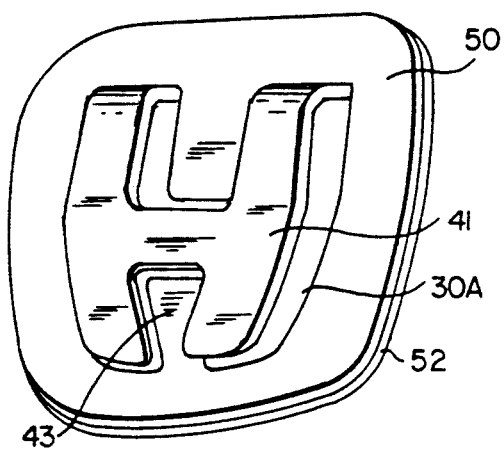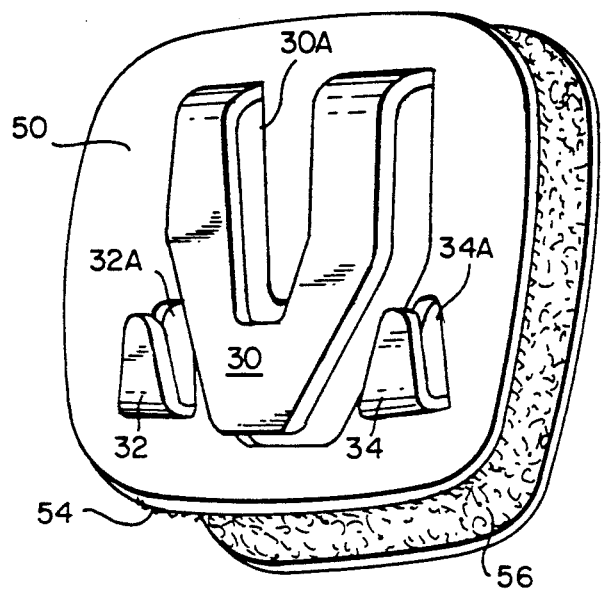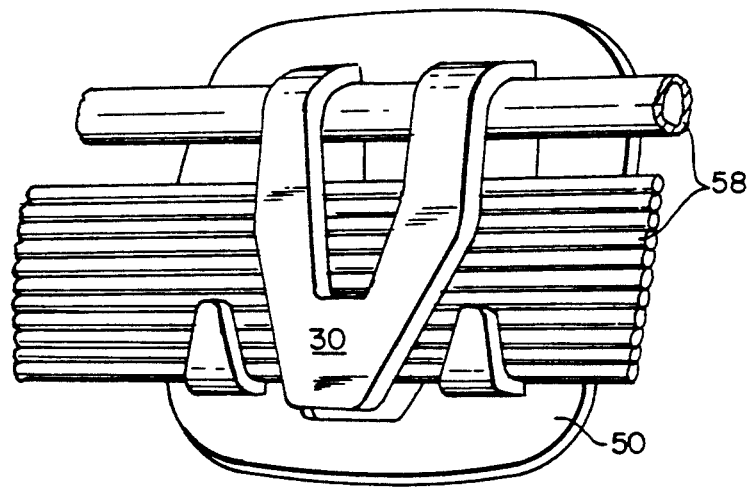

ARTICLE CASE AND SECURING CLIP

BACKGROUND OF THE INVENTION

There have been a myriad of article carrying cases, as eyeglass cases, for example, having means for retaining the articles therein and attaching the same conveniently to the clothes of the user. The same have embraced varying forms, as fabric sleeves having narrow steel spring clips secured within the fabric of the carrying case, or simple sleeve-like loops on a lidded case thereby permitting such a case to be slid onto the waist belt of the user, for example.

These and other forms are known in the art, but present manufacturing and use disadvantages which are desirably avoided. Thus, illustratively, a steel U- or hairpin-like clip may permit the case to be all too easily accidentally removed from a pocket or other garment portion by inadvertently engaged upwardly lifting forces, while in the case of belt-retained sleeve devices, the case cannot be easily removed at all without extensive manipulation or removal of the belt.

Other approaches known in the art have their varying utility but lack features of both ready convenience and durability. Also illustrative thereof is U.S. Pat. No. 4,536,925 to Boothe, among others, wherein the complexity of a pivot pin and spring assembly is required, for example.

Additionally, while generally rigid carrying cases are known, there is a need for such an article case which is attractive, durable, protective of the contents, readily receptive to promotional use as by advertising thereon, and which incorporates, preferably integrally therewith, ready means for detachably securing the same to the apparel of the user, especially as to a belt.

BRIEF SUMMARY OF THE INVENTION

It is therefore a principal object of my invention to provide an article carrier, such as an eyeglass case, that is marked by simplicity, durability, and versatility. To this end, the article carrier comprises essentially longitudinally hinged clamshell halves with a suitable latching detent. One half forms the openable closure while the other half is provided with the unique belt or like clip assembly.

In the preferred embodiment, the clip assembly is integrally formed with the eyeglass or like carrier, as by well known thermoforming or injection molding techniques. The clip itself has no moving parts but comprises a major tongue cooperating with one or a pair of adjacent and confronting small tongues. The small tongues extend from the hinge zone of the case, while the major tongue extends theretoward from the opposite longitudinal edge of the carrier. In the preferred form, the clip tongues are struck from, and shaped in spaced relation, to the back wall of the carrier body.

The respective tongues extend in generally parallel spaced relation to the carrier and do not overlap, but are laterally offset to one another. In the preferred embodiment, the major tongue extends toward and between two oppositely extending small tongues. In securing the carrier thereby to a support, as a belt, but which may be any available narrow-width generally planar surface, the major tongue is flexed slightly outwardly away from the case to embrace the belt or other support on one side with the back of the carrier on the other. The small tongues may then be flexed to embrace the support. Optionally, the support itself, if it possesses some flexibility, as a belt, for example, may be flexed to permit the small tongues to shift to and lie on the same side of the support as the major tongue.

In this position, as on a waist belt, and with the hinged case side down, the case may be readily snapped open from the upper latch side to gain access to the eyeglasses, or other case contents.

In this regard, and to further facilitate personal use as well as providing an attractive appearance, the carrying case, clip means, and all edges and marginal surfaces thereof are slightly radiused or curved, thereby providing ease of handling and wherein the case cannot snag or intercept portions of the garment of the wearer.

While preferred and hereinabove described as an eyeglass case, the present invention finds utility as a carrying case for diverse items of personal, household, or industrial use, as cosmetics, small machine parts, and the like. In similar manner, the case while usually being considered as worn on the person, as on the belt for ready access, may also be quickly mounted and demounted elsewhere for ease of use and access, as on a strip of narrow lath by a workman, or even clipped readily about a group of small cables or wires while working in proximity thereto. Also, as is evident, the clip may not be used at all, allowing the case to be carried in pocket or purse without snagging, as above noted.

While in a preferred form the clip elements are integrally formed with a carrier as a case, it is within the scope of the invention for the clip element to be associated with other bases or supports other than case-like carriers. Such bases need only be of sufficient size to mount the cooperating clip elements, and the base may be provided with means to mount the same elsewhere as desired as by adhesive, "Velcro" hook-and-loop fastenings, and the like, thereby to locate the spring tongue clip as desired. Conversely, as a free-standing clip assembly, the device of the invention may be employed as a means for grouping or clustering and retaining plural elongated members, as cables, conduits, etc., and also as a hanger therefor or for other devices.

Similarly, while an injection-molded assembly is preferable, it is within the scope of the invention for the unique clip portion to be of a material as spring steel, and separately secured to a steel case, as by rivets or the like.

BRIEF DESCRIPTION OF THE DRAWINGS

The invention will be better understood in connection with the accompanying drawings, in which:

FIG. 9 is a perspective view of a further modified form of the invention using the preferred clip and with adhesive mounting means;

FIG. 10 is a perspective view of a yet further modified form of the invention using the modified clip and with "Velcro" mounting means;

FIG. 11 is a perspective view of the clip of FIG. 10 associated with a series of strands, as wires or cables;

DETAILED DESCRIPTION OF THE INVENTION

Figure 1:
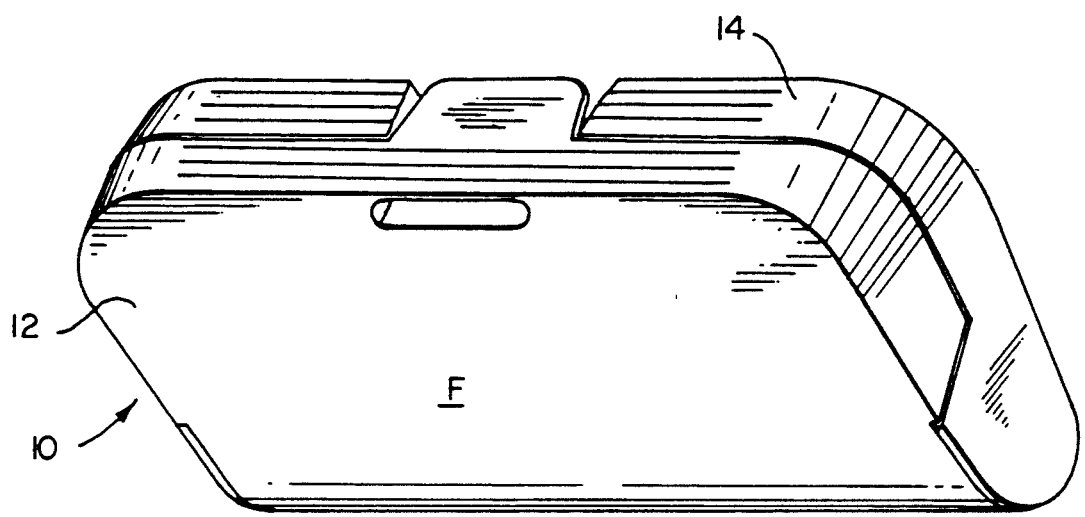
FIG. 1 is a perspective front view of a case according to the invention.
Figure 2:
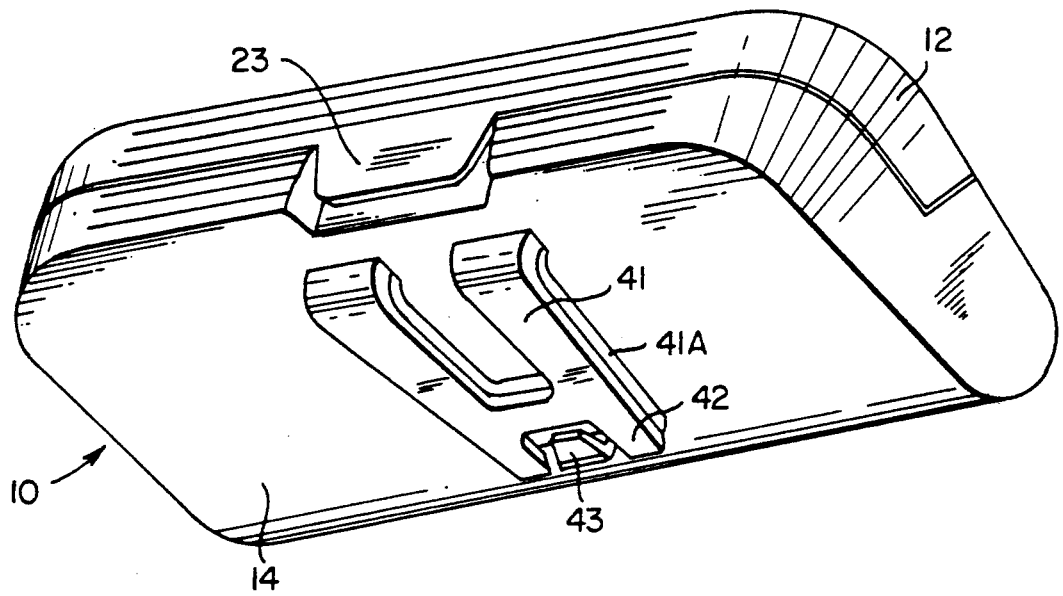
FIG. 2 is a perspective rear view of a case showing one unique clip thereon.

Referring to the drawings, the invention is seen at 10 in FIGS. 1 and 2 and which preferably embraces a molded polymeric case including cover 12 and body 14 connected by longitudinally disposed integral hinges 16 (FIGS. 3 and 4) therebetween. The substantially full-length hinges 16 are interrupted by short gaps 17 near the sides of the case so as to provide rupture stops should the plastic hinge after wear start to tear inwardly from either side. The bounding lateral sidewalls 18 of body 14 are slightly wider than sidewalls 20 of the cover so that the latter may overlap and interfit within the former when the case is closed and prevent inadvertent loss of any contents when the case is first opened with the hinge disposed lowermost as shown.

Figure 3:
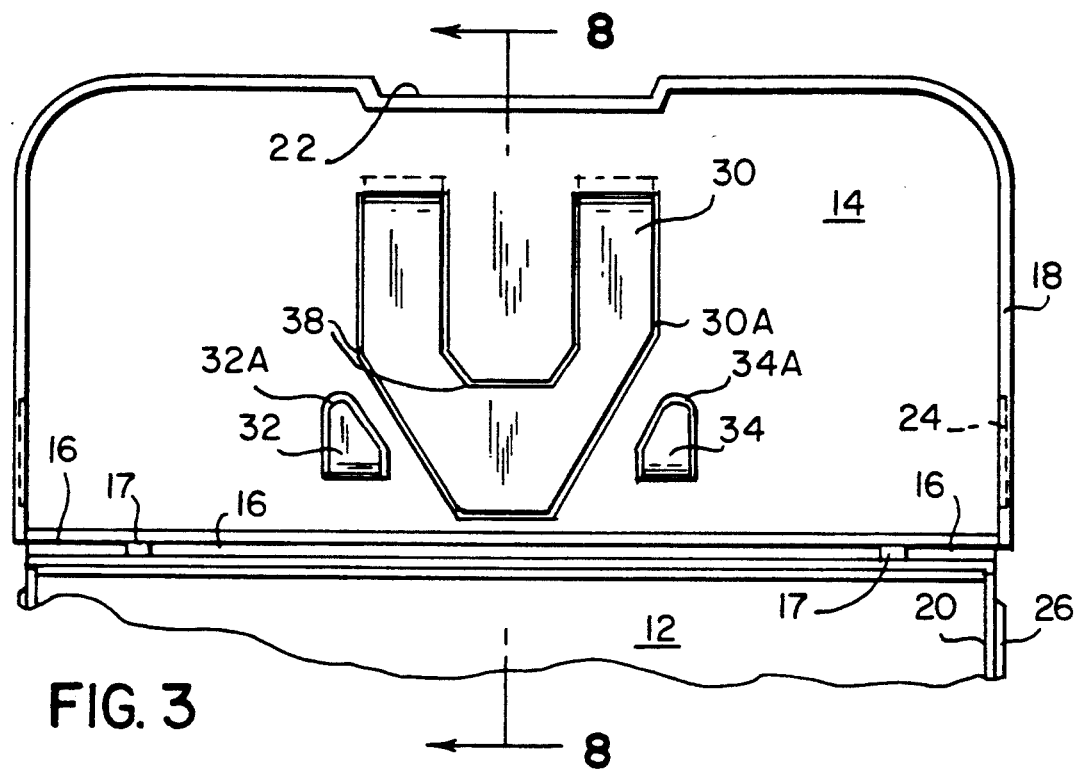
FIG. 3 is a view of the rear wall of a case seen from the inside thereof showing one embodiment of the clip of the invention, a fragmentary portion of the cover being shown open.
Figure 4:
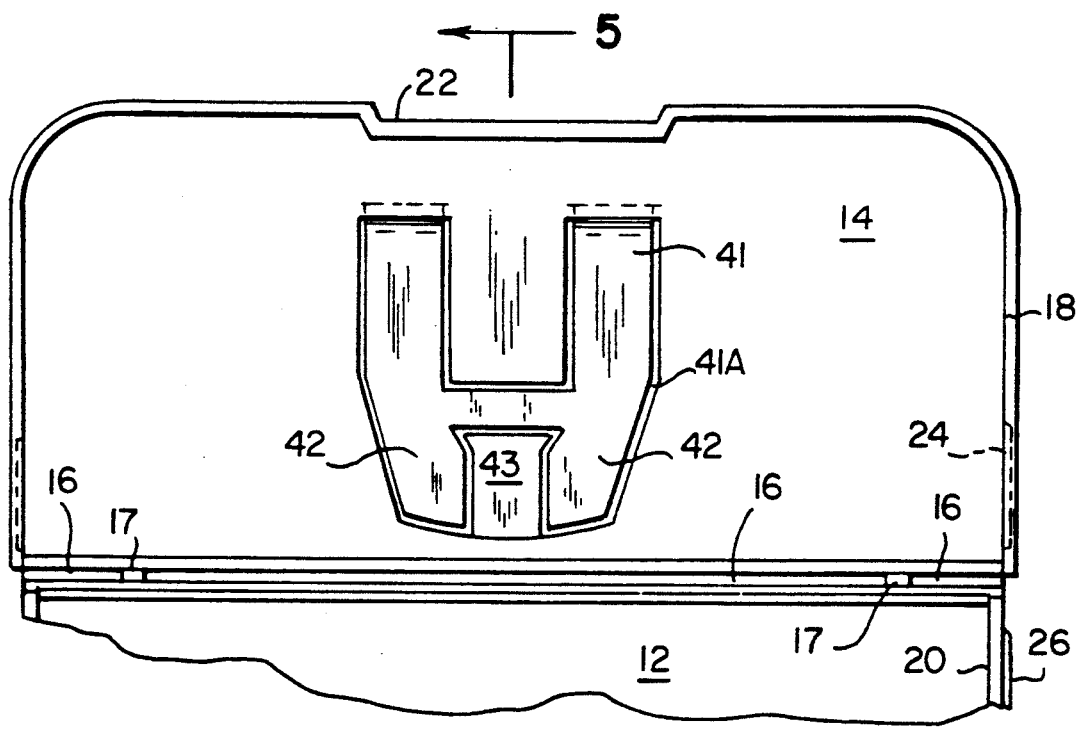
FIG. 4 is similar to FIG. 3 showing a further embodiment of the clip of the invention, the cover being shown open.
Figure 5:
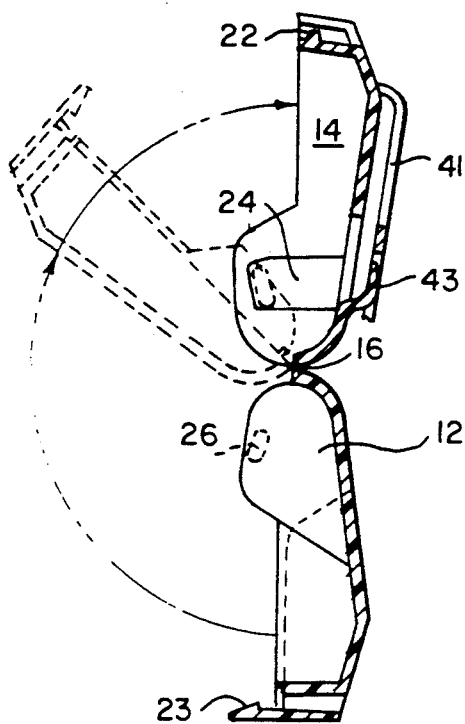
FIG. 5 is a sectional view of the case of FIG. 4 taken on the lines 5—5 of FIG. 4.

Further, the body sidewalls 18 carry shallow recesses 24 (FIGS. 3-8) into which shallow laterally protruding lugs or the like on the cover sidewalls snap as the cover is moved towards closed position, as is evident from FIGS. 4 and 5. Conversely, on opening the case, the lugs 26 tend to limit opening as the same approach the edge of the shallow recesses 24 in opening the case, thereby providing a safety feature against inadvertent full opening and loss of contents. The lugs 26 can be snapped past the recesses 24 in fully opening the cover to the generally 180° position shown.

The front wall of the case opposite the hinges includes conventional latching means known in the art, as for example the recessed dog 22 on the body 14 which cooperates with a conventional tang 23 on the cover 12 to latch the case closed, and which my be readily released by flexing the polymeric material to disengage the latch.

Figure 7:
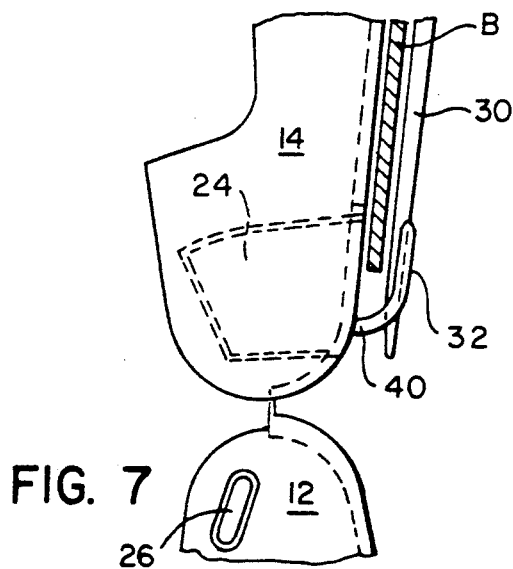
FIG. 7 is an end view of the case of FIG. 3.
Figure 8:
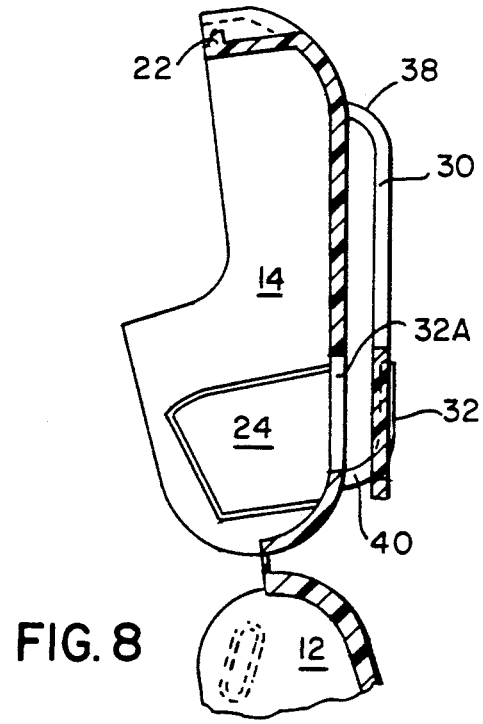
FIG. 8 is a sectional view of the case of FIG. 3 taken generally along the lines 8—8 of FIG. 3.

In a preferred embodiment as seen in FIGS. 3, 7, and 8, in cooperation with the case, and preferably formed from material struck from the back wall of the case body 14 are the several clip tongues as at 30, 32 and 34, by which the case is quickly and releasably attached to a belt B or other support, as discussed further hereinafter. The several tongues comprise a major central tongue 30, and the smaller oppositely extending tongues 32, 34 on either side thereof. As well seen in FIGS. 7 and 8, the tongues extend generally parallel to the back wall of the case body 14, the larger V-shaped tongue 30 including a pair of integral connector legs 38 merging into the case, while each smaller tongue 32, 34 has a like connector leg as at 40 on leg 32 as seen in FIG. 7.

As indicated, to minimize plastic usage and where the case is not intended to contain small parts, the tongues are formed from the case body, thereby leaving complementary apertures 30A, 32A, and 34A in the back wall of body 14. If the tongues are formed from the case itself, sufficient plastic material may be provided to accommodate the extra material required for the connector legs as shown, or the legs can be shorter to provide the requisite length. As indicated, the case and clip means are preferably injection molded in the form shown, or, the apertures 32A etc. may be omitted entirely in an appropriate die when injection molding the same if an aperture-free case is desired.

It will be seen that the several clip tongues are formed without any angular surfaces, wherein all changes of direction along the clip sides are radiused or rounded, as indicated generally at 38. In so doing, ease of handling is enhanced, and more importantly, the clip elements may be readily slipped onto or off from a support without likelihood of hangup on or snagging of the support material, or other nearby surfaces.

Accordingly, the case in any form of the invention, but as seen in FIGS. 3 and 7 for example, whether open or closed, may easily be emplaced onto a support, as a belt B by first slipping the major tongue 30 over the belt and then slightly flexing the small tongues or the belt to dispose the small tongues 32, 34 on the outside of the belt, that is, the same side as the large tongue 30. In such position, as on the waist of a wearer, the case cover may be readily opened and access had to the contents therein, illustratively eyeglasses or sunglasses, by partially opening the case cover 14 to the stops defined by lugs 26 and recesses 24, as illustratively seen in phantom lines in the case of FIG. 5, or fully opened to depending position as shown.

Figure 6:
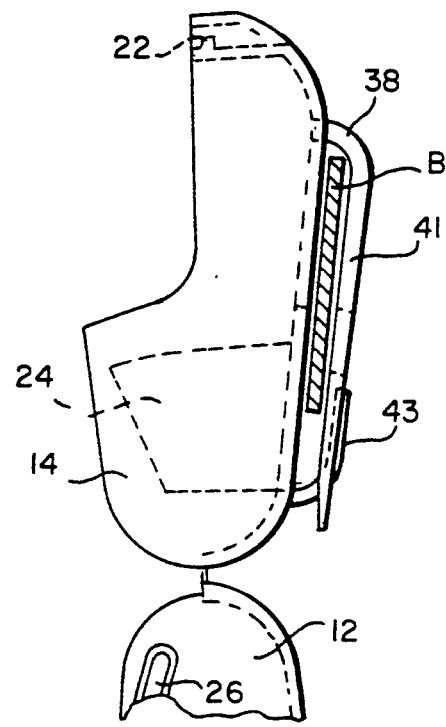
FIG. 6 is an end view of the case of FIG. 4.

The modification of FIGS. 4, 5, and 6 differs from that of the preceding embodiment in that the major tongue 41 is H-shaped rather than V-shaped. Thereby the tongue has bifurcated free ends at 42, 42 which straddle and cooperate with the minor tongue 43 extending between the bifurcated ends 42. In other respects, the case and clip fabrication is substantially similar to the previously discussed form, as is evident from the drawings.

As indicated, while it is preferred to provide a complete hinged case having the clip means therefor, as for eyeglasses, and wherein in so doing the cover of the case when closed provides a substantial surface area for advertising or product promotion, it is within the scope of the invention to provide the tongue clip means with a smaller base, whereby the same may be used as an attachment to other surfaces, or, as a clip or holder for plural elongated members as strands.

In this regard see FIGS. 9-13 setting forth further forms of the invention. Thus in FIG. 9, the clip means of FIG. 2 having the tongues 41, 43 is shown extending from a base 50 of suitable dimensions and wherein the tongues may be struck therefrom or otherwise formed as above noted. The base 50 may be adhered to any surface for use as a retainer or hanger as by adhesive 52 on the base, which may be pressure sensitive or of other type.

Similarly, in FIG. 10 the clip means 30, 32, 34 of FIG. 3 is provided on a like base 50, but wherein the base may have other attachment means, as "Velcro" hook-and-loop means 54, 56 as well known in the art whereby attachment of the Velcro base 56 to a support by adhesive or otherwise permits ready mounting thereon and removal therefrom of the clip means.

Figure 12:
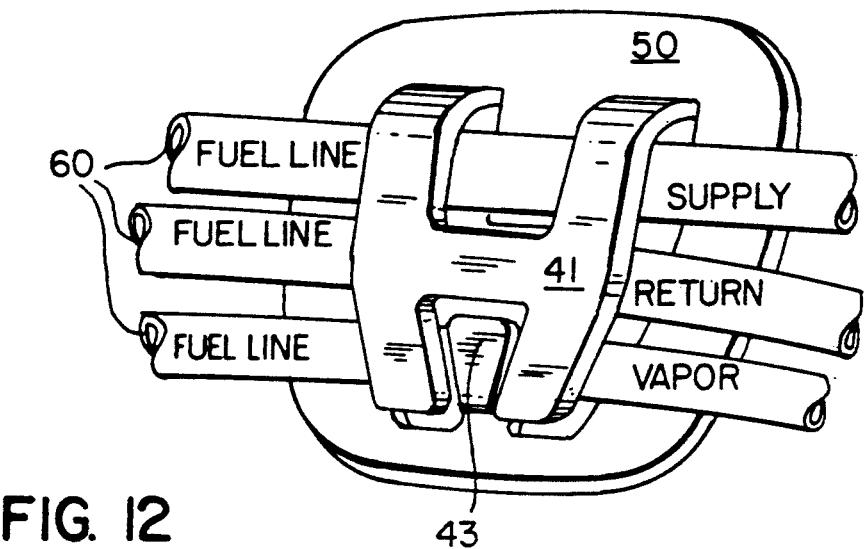
FIG. 12 is a perspective view of the clip of FIG. 9 associated with a series of flow lines or conduits; and, FIG. 13 is a perspective view of the clip of FIG. 9 wherein the clip is used as a hanger.

In FIG. 11, the clip means is used selectively as a retainer of a series of strands or wires 58, or, conversely, mounting the clip at a desired locale on such a group of wires and providing additional attachment means on the opposite face of the base 50 by adhesive and the like as set forth. In such manner a light or a warning sign might be attached to the wire grouping. FIG. 12 is similar and is capable of the selective clustering or alternative mounting with respect to a series of conduits 60 of fluids, as fuel, vapor and the like.

Figure 13:
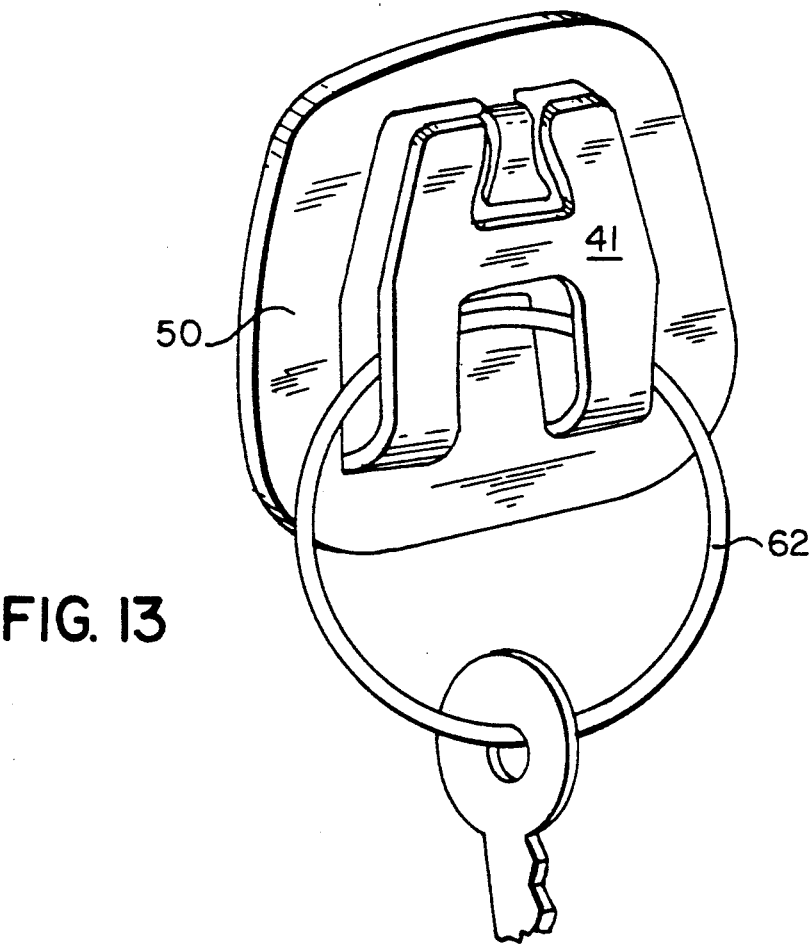

FIG. 13 shows the clip tongue system, with whatever mounting desired, or none, used as a holder or hanger for articles, such as a key ring 62.

As earlier indicated, the case lends itself to advertising and promotion when waist-carried, wherein suitable labelling, printing, or molded legends may be provided on the substantially planar front face F (FIG. 1) of case cover 12.

While in the disclosed and preferred embodiments, the case and the novel clip system are molded from plastic, it is within the scope of the invention to provide the clip members of metal, as spring steel, which may be struck from or separately riveted to a steel case. In like manner, as an attachment clip of FIGS. 9-13, the same may be fabricated from spring steel or other materials which achieving the objects of the invention.

While I have described my invention as set forth hereinabove, it is evident that the same may be employed in other manners and environments apart from those discussed within the scope of the appended claims.

I claim:

1. An article carrier and clip comprising,
an enclosing case for articles,
said case including a wall having flexible clip means thereon,
said clip means including a major tongue extending at one end from said base in substantially parallel relation to and spaced from the wall and terminating in a free end extending in one direction, and a minor tongue extending at one end from said base in substantially parallel relation to and spaced from the wall and terminating in a free end extending in the opposite direction from said major tongue one end,
said tongues being disposed in substantially coplanar and laterally adjacent relation with said free ends of said tongues extending past each other in said one and opposite directions,
thereby to define an open-ended zone between said tongues and said wall within which an elongated member may be slipped by flexing said major tongue away from said minor tongue whereby a said elongated member is confined and restrained within said zone between said tongues on one side and said wall on the other side.

2. The article carrier of claim 1 including a second minor tongue, said minor tongues being disposed respectively on either side of and in laterally spaced relation to said major tongue.

3. The article carrier of claim 1 wherein said major tongue has a pair of distal portion at said free end in laterally spaced relation and disposed on either side of said minor tongue.

4. The article carrier of claim 1 wherein said tongues are integrally formed with said case wall.

5. The article carrier of claim 1 wherein said tongues are curved throughout their length at all changes of edge direction, thereby to avoid all angular or sharp edges.

6. The article carrier of claim 1 wherein the same is injection molded from polymeric material.

7. The article carrier of claim 1 wherein the same is formed from spring steel.

8. A clip assembly for mounting on a support comprising:
a base,
a flexible major tongue extending at one end from said base in substantially parallel relation to and spaced from said base and terminating in a free end extending in one direction, and a minor tongue extending at one end from said base in substantially parallels relation to and spaced from said base and terminating in a free end extending in the opposite direction from said major tongue one end,
said tongues being disposed in substantially coplanar and laterally adjacent relation with said free ends of said tongues extending past each other in said one and opposite directions,
thereby to define an open-ended zone between said tongues and said wall within which an elongated member may be slipped by flexing said major tongue away from said minor tongue whereby a said elongated member is confined and restrained within said zone between said tongues on one side and said wall on the other side.

9. The clip assembly of claim 8 including a second minor tongue, said minor tongues being disposed respectively on either side of and in laterally spaced relation to said major tongue.

10. The clip assembly of claim 8 wherein said major tongue has a pair of distal portions at said free end in laterally spaced relation and disposed on either side of said minor tongue.

11. The clip assembly of claim 8 wherein said tongues are integrally formed with said base.

12. The clip assembly of claim 8 wherein said tongues are curved throughout their length at all changes of edge direction, thereby to avoid all angular or sharp edges.

13. The clip assembly of claim 8 further including adhesive means on the opposite face of said base member from said tongues.

14. The clip assembly of claim 8 further including hook-and-loop securement means on the opposite face of said base member from said tongues.

15. The clip assembly of claim 8 wherein the same is injection molded from polymeric material.

16. The clip assembly of claim 8 wherein the same is formed from spring steel.

* * * * *